United States Patent Office 3,225,951
Patented Dec. 28, 1965

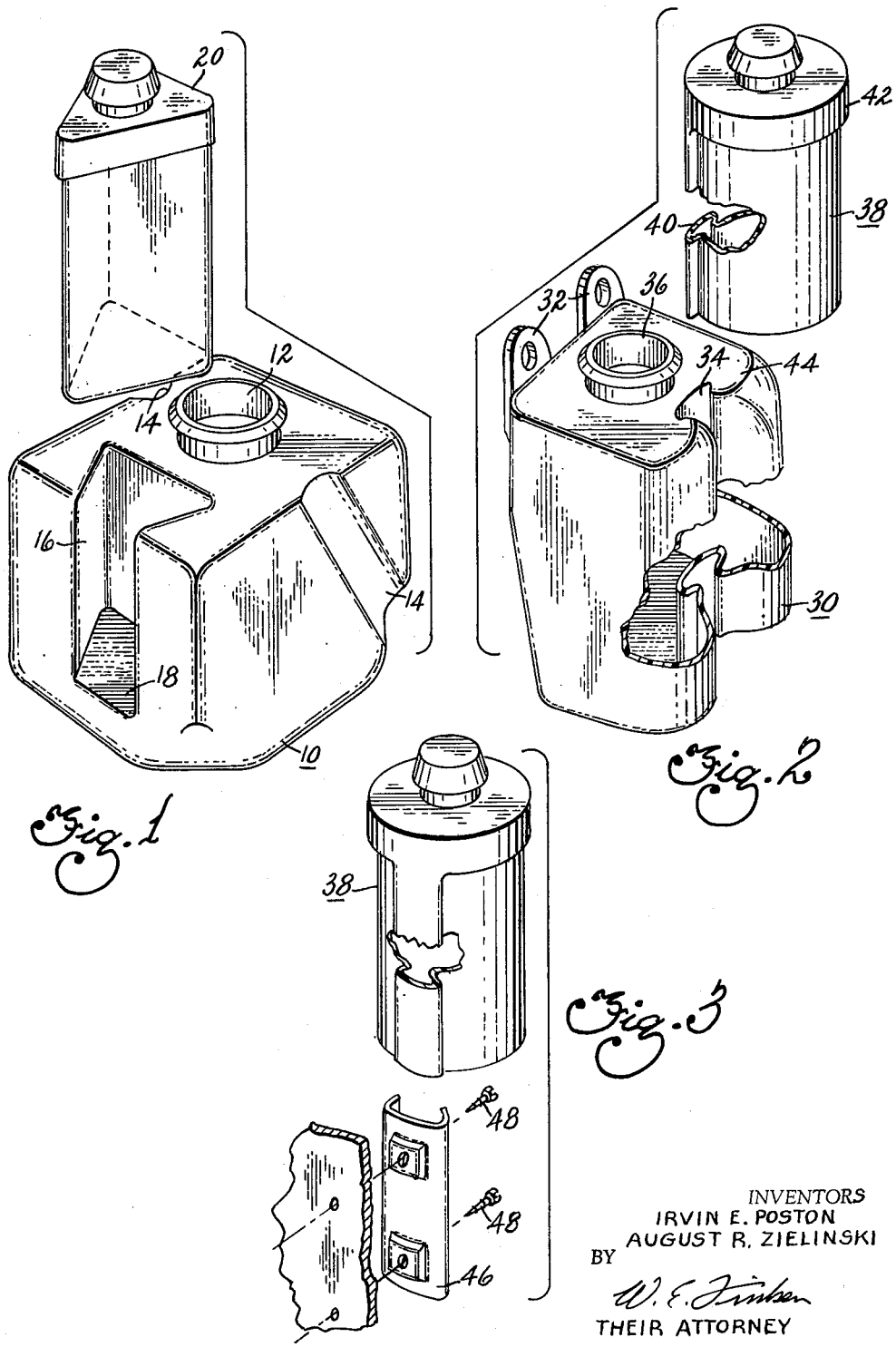

3,225,951
WINDSHIELD WASHER EQUIPMENT
Irvin E. Poston, Birmingham, and August R. Zielinski, Detroit, Mich., assignors to General Motors Corporation, Detroit, Mich., a corporation of Delaware
Filed July 16, 1963, Ser. No. 295,342
1 Claim. (Cl. 215—6)

This invention pertains to equipment for vehicle windshield washers, and particularly to improved constructions of windshield washer reservoirs and washer solvent containers.

Windshield washing systems are furnished as original equipment on new vehicles as a safety accessory, this mechanism generally comprising a washer reservoir, a pump, spray nozzles, flexible tubing connecting the reservoir with the pump and the pump with the spray nozzles, and a suitable control for the mechanism. In the last several years it has been the custom of some vehicle manufacturers to furnish a bottle of concentrated washer solvent which is mixed with water in the reservoir to form a washing, or cleaning, solution. For the sake of convenience, the bottle of concentrated washer solvent is clipped to the vehicle within the engine compartment so that it is readily accessible when the washer reservoir requires refilling.

In one aspect the present invention relates to improved washer reservoir constructions which embody integral formations for supporting a bottle of concentrated washer solvent thus eliminating the need for a separate fastening clip such as heretofore used. Another aspect of the present invention is concerned with the construction of washer reservoirs and solvent containers having complementary formations of the tongue and groove type whereby the solvent container can be detachably supported by the washer reservoir, or in instances where there is insufficient room in the vicinity of the reservoir the solvent container can be supported by a separate spring metal clip.

Accordingly, among our objects are the provision of windshield washer reservoirs and solvent containers of resilient plastic having complementary integral tongue and groove formations such that the solvent container can be supported by the reservoir; the further provision of a resilient plastic washer reservoir having a substantially triangular slot for receiving and supporting a conventional glass solvent container having triangular cross-sectional configurations; and the still further provision of a resilient plastic solvent container having an integral dovetail tongue formation adapted for reception in either a complementary groove in a resilient plastic washer reservoir or a spring metal clip.

The aforementioned and other objects are accomplished in the present invention by utilizing blow molded resiliently flexible plastic material for the reservoir and a similar blow molded material for the solvent container, the reservoir and the container having complementary projection and recess formations thereon such that the solvent container can be securely supported by the reservoir.

Further advantages and objects of the present invention will be apparent from the following description, reference being had to the accompanying drawing, and wherein preferred embodiments of the present invention are clearly shown.

In the drawing:

FIGURE 1 is an exploded perspective view of one embodiment of the present invention comprising a resilient plastic reservoir for supporting a glass solvent container.

FIGURE 2 is an exploded perspective view, partly in section and partly in elevation, with certain parts broken away, of the preferred embodiment of a resilient plastic reservoir and solvent container having complementary dovetail tongue and groove formations.

FIGURE 3 is a perspective view, with certain parts broken away, partly in section and partly in elevation, of a modified supporting clip for the resilient plastic solvent container shown in the preferred embodiment.

With reference to FIGURE 1, a blow molded resilient plastic washer reservoir 10 is shown having a fill opening 12, and recesses 14 in opposed side walls thereof for receiving a supporting bracket, not shown, by which the reservoir is supported within the engine compartment of the motor vehicle. It is to be understood that the fill opening 12 is provided with a suitable cap, not shown, for closing the same, which cap may conveniently support a flexible conduit for connecting the reservoir to a washer pump. Alternately the flexible pump intake conduit can be inserted through any wall of the reservoir. Another side wall of the reservoir 10 has a slot 16 formed therein, which is generally in the shape of a triangle with an open-sided apex. The slot, or recess, 16 has a bottom wall 18 spaced above the bottom wall of the reservoir 10.

The resilient plastic reservoir 10 is adapted to support a concentrated washer solvent container, or bottle, 20 of conventional triangular cross-sectional configuration. The bottle 20 may be of glass, or alternatively, of blow molded resiliently flexible plastic material. It is apparent that the slot 16 is of a shape complementary to the bottle 20, and thus the bottle 20 can be inserted into the open end of the slot 16 so as to be supported by the reservoir 10. By using a resilient plastic to form the reservoir 10, the bottle 20 will be securely supported at all times, with the bottom of the bottle resting on the closed end 18 of the slot.

Referring to FIGURE 2, in the preferred embodiment both the solvent container and the washer reservoir are of blow molded resiliently flexible plastic material. In this embodiment the reservoir 30 is formed with an integral pair of apertured ears 32 on one side will thereof, and a dovetail slot, or groove, 34 on the opposite side wall thereof. The top of the reservoir 30 is provided with a fill opening 36. The plastic solvent container, or bottle, 38 is formed with a complementary axially extending dovetailed projection, or tongue, 40 which merges with and terminates in a rim, or abutment, 42 adjacent the top of the bottle. The rim 42 is of larger diameter than the generally cylindrical body of the bottle with which the tongue 40 is coextensive.

Accordingly, it will be apparent that the tongue 40 can be inserted into the grooves 34 of the washer reservoir 30 and pushed downwardly until the rim 42 engages the top surface 44 of the washer reservoir. The washer reservoir 30 can be attached at any convenient place within the vehicle engine compartment by inserting fasteners through the apertured supporting ears 32. As in the first embodiment, by virtue of the fact that both the solvent container and the reservoir are formed of resilient plastic, the solvent container will be securely supported by the reservoir.

Referring to FIGURE 3, the resilient plastic solvent container 38 of the preferred embodiment can also be supported by a spring metal channel 46 of dovetail configuration. The spring metal clip 46 may be conveniently attached to the vehicle within the engine compartment by a pair of screws 48. It is to be understood that it is preferred to support the solvent container on the washer reservoir itself, but in some vehicle installations this may not be possible due to the location of the reservoir within the engine compartment.

It is to be understood that the embodiments disclosed herein are only exemplary, and are not to be construed as limitations. Thus, it is within our inventive concept to provide a protruding formation on the reservoir and a complementary recess in the solvent container.

While the embodiments of the invention as herein disclosed constitute preferred forms, it is to be understood that other forms might be adopted.

What is claimed is as follows:

Vehicular windshield washer equipment comprising, a washer reservoir of resiliently flexible plastic material having top, bottom and side walls and adapted for attachment to a vehicle, and a washer solvent container adapted to be supported by said reservoir, said reservoir having a recess of dovetail configuration in one of its side walls and said solvent container having a complementary dovetailed projection which terminates in a rim adjacent the top of the container, said projection being adapted to be received in the recess of said reservoir with the rim in engagement with the top wall of said reservoir so as to resiliently support the container on the reservoir.

References Cited by the Examiner

UNITED STATES PATENTS

| | | | |
|---|---|---|---|
| 2,744,649 | 5/1956 | Smith | 215—6 |
| 2,780,225 | 2/1957 | Barr | 215—6 |

FOREIGN PATENTS

| | | |
|---|---|---|
| 1,099,180 | 8/1955 | France. |
| 729,092 | 12/1942 | Germany. |
| 1,142,431 | 1/1963 | Germany. |
| 846,602 | 8/1960 | Great Britain. |

THERON E. CONDON, *Primary Examiner.*

GEORGE E. LOWRANCE, *Examiner.*